Nov. 10, 1931.  H. I. HOLLAND  1,831,003
DEVICE FOR REMOVING BALL RACES AND BUSHINGS
Filed April 14, 1930  2 Sheets-Sheet 1

Inventor:
Herbert I. Holland
By Owen W. Kennedy
Attorney

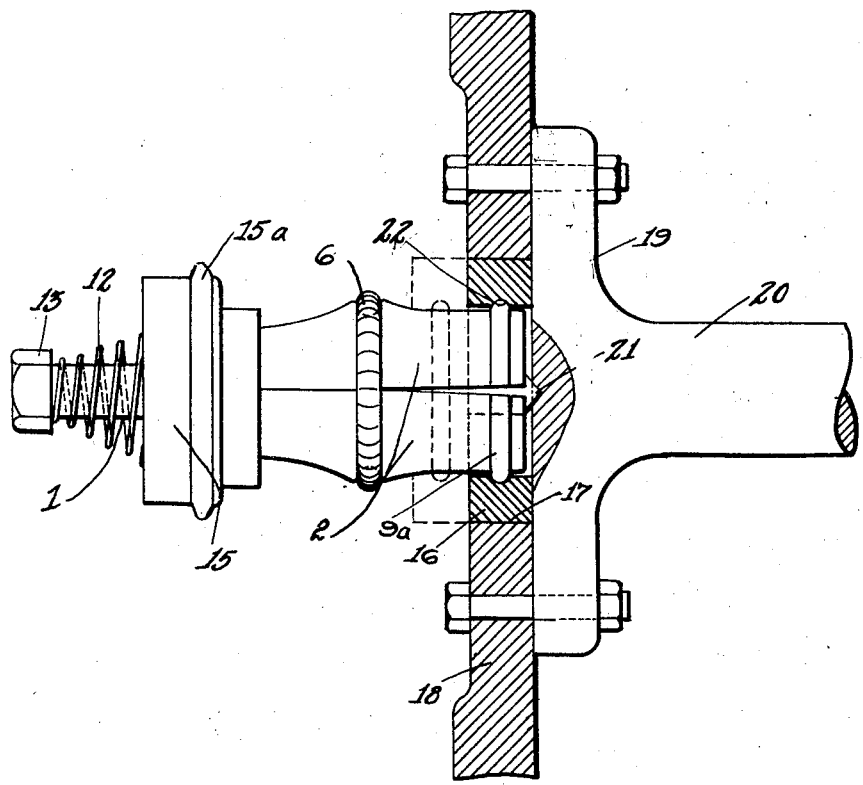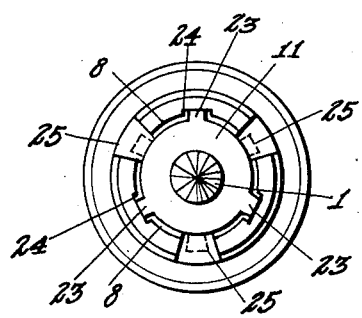

Patented Nov. 10, 1931

1,831,003

UNITED STATES PATENT OFFICE

HERBERT I. HOLLAND, OF WORCESTER, MASSACHUSETTS, ASSIGNOR TO DANIEL A. HOLLAND, SR., OF WORCESTER, MASSACHUSETTS

DEVICE FOR REMOVING BALL RACES AND BUSHINGS

Application filed April 14, 1930. Serial No. 444,093.

The present invention relates to a device for removing ring-like articles, such as ball races and bushings, from openings in which they may be tightly seated.

The object of the invention is to provide a device of the above indicated character which may be readily engaged with the inner periphery of a bell race or bushing and then operated so as to withdraw the same from its surrounding opening no matter how tightly it may be seated and without in any way damaging the article so removed. A further object of the invention is to provide a device which is so constructed that its several component parts are always maintained in an assembled condition so that the device is always readily operable with little or no possibility of the parts becoming lost or mislaid.

Furthermore, my device is characterized by the fact that it may be utilized to operate on ball races or bushings of different inside diameters, without making it necessary to add or substitute any parts of the device when it is desired to change from one ball bearing race diameter to another. The above and other advantageous features of my invention will hereinafter more fully appear with reference to the accompanying drawings in which—

Fig. 5 is a view partially in section and partially in side elevation, showing the operation of the device in removing a ball race from an opening.

Fig. 6 is an end view of the device shown in Fig. 1, illustrating the manner in which the jaws may be expanded to a different diameter.

Like reference characters refer to like parts in the different figures.

Figure 1:
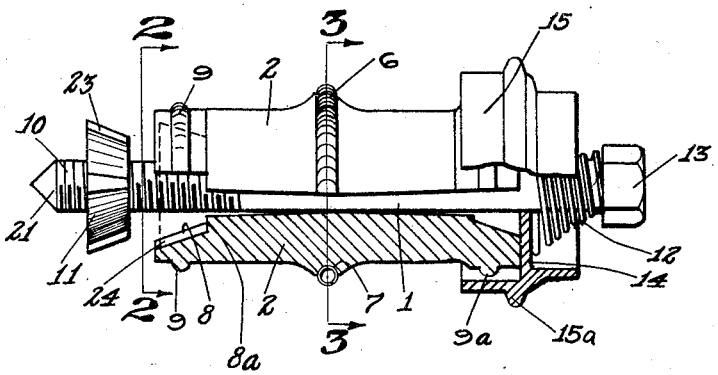
Fig. 1 is a view partially in section and partially in side elevation of a device embodying my invention.
Figure 3:
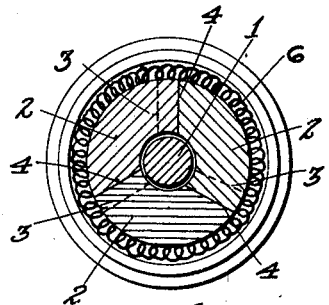
Fig. 3 is a vertical sectional view along the line 3—3 of Fig. 1, looking in the direction of the arrows.
Figure 4:
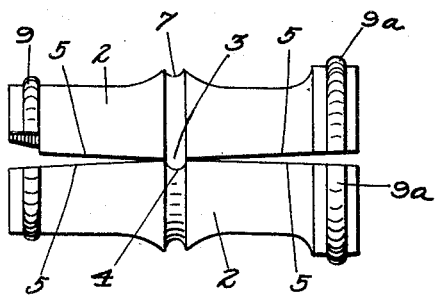
Fig. 4 is a fragmentary plan view of a pair of the race engaging jaws shown in Fig. 1.

As best shown in Figs. 1, 3 and 4, the device comprises a central operating stud 1 about which are arranged a group of jaws 2, 2 identical in construction so that only one need be described in detail. Each jaw 2 is arcuate in cross section so that when the jaws are assembled around a stud 1 they will completely inclose the same and the jaws are all capable of pivotal movement with respect to each other by reason of the provision of a series of pivots 3, 3 disposed between abutting faces of the jaws intermediate their ends. As indicated, the pivots 3 are in the form of lugs formed integrally with the jaws, although separate pins may be employed.

As best shown in Fig. 4, the pivot lug 3, carried by one jaw, is received in a curved seat 4 provided in the abutting face of the next adjacent jaw so that when the jaws 2 are assembled, as shown, they are capable of rocking movement with respect to each other, since the abutting edges of the jaws are oppositely inclined slightly, away from the lugs 3 and seats 4 as indicated at 5, 5. As a result of the above described pivotal relation of the jaws 2 and the opposite inclination of the jaw surfaces 5, 5, it is evident that the extremities of the jaws 2 can be expanded or contracted with equal facility at either end of the assembly. When the jaws 2 have been assembled, as shown in Fig. 4, they are adapted to be yieldingly held together by means of a flexible member 6 received in a groove 7 provided around the middle portion of the several jaws. While the flexible member 6 is shown as a coil spring for convenience of illustration, obviously a split ring could be employed for the same purpose.

Figure 2:
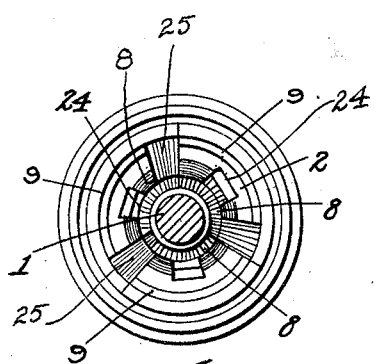
Fig. 2 is a vertical sectional view along the line 2—2 of Fig. 1, looking in the direction of the arrows.

Referring now to Fig. 1, it will be seen that the end of each jaw 2 provides a tapered seat 8 spaced from the surface of the central stud 1 and inclined outwardly. The seat 8 of each jaw is oppositely disposed with respect to a projection 9 formed on the outside of the jaw end, so that when the assembled jaws 2 are viewed from one end as in Fig. 2, the several tapered seats 8 present a more or less continuous outwardly flaring recess, while the several projections 9 present a substantially continuous circular raised surface symmetrical about the axis of the stud 1. The threaded portion 10 of the stud 1 carries a wedging nut 11 having a tapered outer surface substantially corresponding to the taper of the jaw seats 8. While the nut 11 is shown as being out of engagement with the jaw seats 8, in Fig. 1, the normal condition of the device is such that the nut 11 is loosely received in the seats 8, as indicated in dotted lines. In order to maintain the parts in an operative condition with the nut 11 loosely received in the jaw ends, a spiral spring 12 loosely surrounds the opposite end of the stud 1 with one end bearing on the head 13 of the stud. The opposite larger end of the spring 12 bears on the central flange 14 of a sleeve 15 surrounding the end portions of the jaws 2. The sleeve 15 merely serves to keep the ends of the jaws in their circular arrangement and it is obvious that with the nut 11 turned to a position near the threaded end of the stud 1, the slight tension of the spring 12 permits the nut 11 to be projected beyond the ends of the jaws, as shown in full lines in Fig. 1, although normally the spring 12 maintains the nut 11 loosely in engagement with the seats 8.

Referring now to Fig. 5, the device is shown as being employed for removing a ball race 16 which is tightly seated in an opening 17. In order to better illustrate the particular utility of the device, the opening 17 which receives the ball race 16 is indicated as being provided in the flange 18 of a flywheel which is in turn connected to the flanged end portion 19 of a driving member, such as a crank shaft 20. When a ball race is so seated, its removal present a particularly difficult problem, unless the flywheel is removed, and as will now appear my device makes it possible to readily withdraw the race 16 by a simple operation.

The parts of the device are shown as having been assembled with the wedging nut 11 received within the jaw seats, the nut 11 being so positioned on the stud that the pointed end 21 of the stud just extends beyond the end of the jaws. The ends of the jaws are then inserted within the race 16 so as to loosely receive the projections 9 in the ball groove 22 provided on the inner face of the race 16. The stud 1 is then turned by means of its head 13 to cause its pointed end 21 to engage the end of the fixed shaft 20 and it is obvious that as soon as the stud reaches the shaft, further turning thereof will cause the nut 11 to be moved into the ends of the jaws. Since the nut 11 and the jaw seats 8 have substantially the same taper, movement of the nut 11 will uniformly expand the jaw ends about the pivot lugs 3 to cause the jaw projections 9 to tightly grip the groove 22 in the ball race 16.

When the ball race 16 has been so gripped by the jaws, obviously further turning of the stud 1 against the fixed shaft will result in the race 16 being withdrawn from its opening, as indicated in dotted lines, and this withdrawal will take place slowly and evenly no matter how tightly the race 16 may have been seated.

As previously pointed out, my improved device is adapted to remove ball races of different diameters, and this result is obtained by making the right hand ends of the jaws larger than the left hand ends. Consequently the projections 9a at the right hand ends of the jaws, shown in Fig. 4, present a circular form considerably larger in diameter than that presented by the projections 9. Preferably the projections 9 and 9a are designed to loosely fit the ball grooves of standard races of different diameters when the tool is collapsed.

Figure 2A:
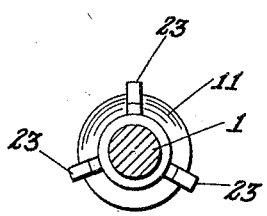
Fig. 2a is a sectional view along the line 2—2 of Fig. 1 looking in the opposite direction from the arrows.

In addition, the left hand ends of the jaws 2 are adapted to engage a ball race of still another inside diameter by merely changing the initial position of the nut 11 when loosely seated in the jaws. As shown in Fig. 2a, the nut 11 presents raised ribs 23 having the same taper as the surfaces of the nut between the ribs. When it is desired to have the jaw projections 9 operate on a ball race larger in internal diameter than the race shown in Fig. 5, the nut 11 is initially positioned within the jaws so that the ribs 23 are received in shallow notches 24 provided in the seats 8. This adjusted position of the nut 11 is shown in Fig. 6, from which it is evident that the ribs 23 will expand the jaws further apart than would the surfaces of the nut between the ribs. When it is desired to render the ribs 23 inoperative, the nut is initially positioned with the ribs received in open notches 25 provided in each jaw end as indicated in dotted lines in Fig. 6.

From the foregoing it is apparent that by my invention I have provided an extremely effective device for removing ringlike bodies such as ball races and bushings from openings in which they may be tightly seated. In using the device, it is impossible for the wedging nut 11 to spread the jaw ends too far apart, so as to expand the ball race itself, since the travel of the nut 11 in the seats 8 is limited by the shoulders 8a at the inner ends of the seats, as indicated in Fig. 1. The wedging action of the nut 11 is just enough to cause the projections 9 to grip the ball race closely, after which further turning of the stud 1 results in drawing the race out of the opening. It is evident that when the stud 1 is turned, the ribs 23 on the nut 11 will positively prevent the nut from turning with the stud, so that turning of the stud is immediately effective to cause the jaws 2 to engage the race and withdraw the same. The ribs 23 prevent turning of the nut 11 in any one of the several positions of the nut, with respect to the jaws. For convenience of operation, the alining sleeve 15 is provided with a peripheral projection 15a to enable the user to hold the sleeve retracted when he projects the jaws forward to engage a ball race.

I claim,

1. A device of the class described comprising a stud, jaws arranged symmetrically about the axis of said stud in pivotal relation with their end portions providing tapered seats and external projections, arranged circularly with different outside diameters, and a tapered nut in threaded engagement with said stud adapted to engage the seats at opposite ends of said jaws to expand them outwardly in accordance with which jaw ends are engaged by said nut.

2. A device of the class described comprising a stud, jaws arranged symmetrically about the axis of said stud in pivotal relation with their end portions providing tapered seats and external projections arranged circularly, and a tapered nut in threaded engagement with said stud for coaction with the seats of said jaws, said nut also providing projecting ribs adapted to register with notches in said jaw seats, whereby movement of said nut on said stud is adapted to expand the same jaw ends to different diameters.

3. A device of the class described comprising a stud, jaws arranged symmetrically about the axis of said stud, with end portions providing seats, and a nut in threaded engagement with said stud adapted to engage said jaw seats upon turning of said stud, said nut being provided with means to prevent it from turning with said stud.

4. A device of the class described comprising a stud, jaws arranged symmetrically about the axis of said stud, with end portions providing seats, and a nut in threaded engagement with said stud adapted to engage said jaw seats upon turning of said stud, said nut being provided with means to prevent it from turning with said stud, whereby relative movement between said stud and said nut results in expansion of said jaws.

HERBERT I. HOLLAND.